(12) United States Patent
Hino

(10) Patent No.: US 10,371,366 B2
(45) Date of Patent: Aug. 6, 2019

(54) LIGHTING DEVICE FOR VEHICLE, MANUFACTURING METHOD OF LIGHTING DEVICE FOR VEHICLE, AND LIGHTING TOOL FOR VEHICLE

(71) Applicant: Toshiba Lighting & Technology Corporation, Yokosuka-shi, Kanagawa-ken (JP)

(72) Inventor: Kiyokazu Hino, Yokosuka (JP)

(73) Assignee: Toshiba Lighting & Technology Corporation, Yokosuka-shi, Kanagawa-ken (JP)

( * ) Notice: Subject to any disclaimer, the term of this patent is extended or adjusted under 35 U.S.C. 154(b) by 64 days.

(21) Appl. No.: 15/670,114

(22) Filed: Aug. 7, 2017

(65) Prior Publication Data
US 2018/0100643 A1 Apr. 12, 2018

(30) Foreign Application Priority Data
Oct. 11, 2016 (JP) .................. 2016-199942

(51) Int. Cl.
| | |
|---|---|
| *F21S 43/19* | (2018.01) |
| *F21V 23/06* | (2006.01) |
| *B29C 65/64* | (2006.01) |
| *B29C 65/02* | (2006.01) |
| *F21S 43/14* | (2018.01) |
| *F21S 45/00* | (2018.01) |
| *F21S 45/48* | (2018.01) |

(Continued)

(52) U.S. Cl.
CPC .............. *F21V 23/06* (2013.01); *B29C 65/02* (2013.01); *B29C 65/645* (2013.01); *F21S 43/14* (2018.01); *F21S 43/195* (2018.01); *F21S 45/00* (2018.01); *F21S 45/48* (2018.01); *F21W 2102/00* (2018.01); *F21W 2103/00* (2018.01); *F21W 2103/20* (2018.01); *F21Y 2115/10* (2016.08)

(58) Field of Classification Search
None
See application file for complete search history.

(56) References Cited

U.S. PATENT DOCUMENTS

| 4,012,658 A | 3/1977 | Vause |
|---|---|---|
| 5,243,501 A | 9/1993 | Makita et al. |

(Continued)

FOREIGN PATENT DOCUMENTS

| EP | 3026329 A1 | 6/2016 |
|---|---|---|
| JP | S59-078402 A | 5/1984 |

(Continued)

OTHER PUBLICATIONS

Jan. 31, 2018—(EP) Extended search report—App 17184858.3.

*Primary Examiner* — Tho D Ta
(74) *Attorney, Agent, or Firm* — Banner & Witcoff, Ltd.

(57) ABSTRACT

According to one embodiment, a lighting device for vehicle includes a socket; a light emitting unit which is provided at one end portion of the socket, and includes a light emitting element; an insulating portion which includes a resin, and is provided inside a hole provided in the socket; a power feeding terminal which has conductivity, extends inside the insulating portion, and of which one end portion protrudes from the insulating portion, and is electrically connected to the light emitting unit; and a melting portion which is connected to an inner wall face of the hole, and at least one end face of the insulating portion.

20 Claims, 4 Drawing Sheets

(51) Int. Cl.
*F21Y 115/10* (2016.01)
*F21W 103/20* (2018.01)
*F21W 102/00* (2018.01)
*F21W 103/00* (2018.01)

(56) References Cited

U.S. PATENT DOCUMENTS

| | | |
|---|---|---|
| 2008/0117647 A1 | 5/2008 | Behr et al. |
| 2015/0016136 A1* | 1/2015 | Nakano ............... F21S 43/195 362/520 |
| 2015/0147912 A1* | 5/2015 | Lutz .................. H01R 13/5045 439/577 |
| 2016/0153636 A1 | 6/2016 | Shiraishi |
| 2017/0097136 A1 | 4/2017 | Hino et al. |

FOREIGN PATENT DOCUMENTS

| | | |
|---|---|---|
| JP | 2006-324217 A | 11/2006 |
| JP | 2014-038731 A | 2/2014 |
| JP | 2014-238981 A | 12/2014 |
| JP | 2015-069709 A | 4/2015 |
| JP | 2016-106353 A | 6/2016 |

* cited by examiner

LIGHTING DEVICE FOR VEHICLE, MANUFACTURING METHOD OF LIGHTING DEVICE FOR VEHICLE, AND LIGHTING TOOL FOR VEHICLE

CROSS-REFERENCE TO RELATED APPLICATIONS

This application is based upon and claims the benefit of priority from Japanese Patent Application No. 2016-199942, filed on Oct. 11, 2016; the entire contents of which are incorporated herein by reference.

FIELD

Embodiments described herein relate generally to a lighting device for vehicle, a manufacturing method of the lighting device for vehicle, and a lighting tool for vehicle.

BACKGROUND

There is a lighting device for vehicle which is provided with a socket, a light emitting unit which is provided at one end portion of the socket, and includes a light emitting diode (LED), and a power feeding terminal of which one end portion provided inside the socket is electrically connected to the light emitting unit.

Heat generated in the light emitting diode is mainly radiated to the outside through the socket. For this reason, the socket is formed of a material with high heat conductivity such as metal, or a high heat conductive resin. In this case, the material with high heat conductivity such as metal, or the high heat conductive resin has conductivity. For this reason, an insulating portion formed of a resin with an insulating property is provided between the socket and the power feeding terminal. The insulating portion is press-fitted into a hole provided in the socket.

Here, there is a difference in thermal expansion amount (or, thermal contraction amount) between the socket and the insulating portion which are formed of different materials. In addition, in a case of the lighting device for vehicle provided in a vehicle, a temperature in use environment is changed in a range of −40° C. to 85° C. For this reason, thermal expansion and thermal contraction of a different amount repeatedly occurs in the socket and the insulating portion due to the change in temperature of the use environment, and there is a concern that a sectional dimension of a hole into which the insulating portion is press-fitted may become large, or a sectional dimension of the insulating portion may become small. When a sectional dimension of the hole into which the insulating portion is press-fitted becomes large, or the sectional dimension of the insulating portion becomes small, there is a concern that a slight gap may be formed between the socket and the insulating portion, and bonding intensity therebetween may decrease.

Therefore, there is a desire for a development of a technology in which it is possible to improve reliability in fixing of the insulating portion.

DETAILED DESCRIPTION

Figure 1:
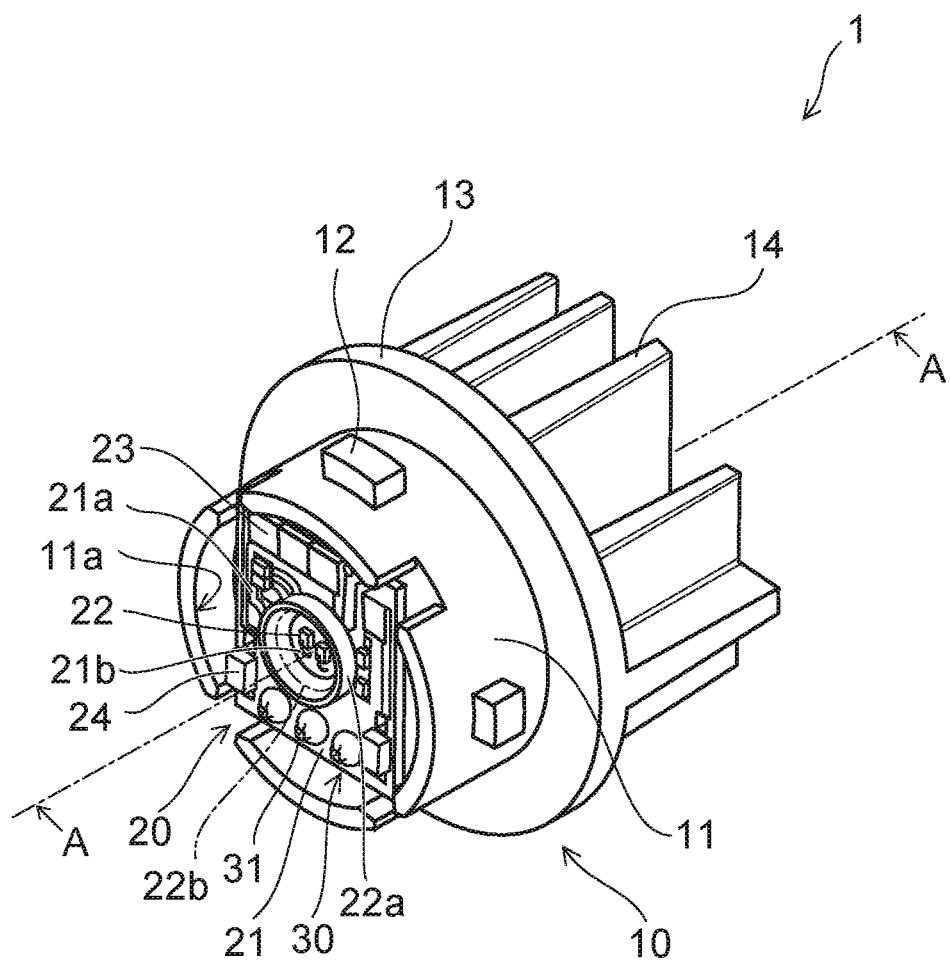
FIG. 1 is a schematic perspective view for exemplifying a lighting device for vehicle according to an embodiment.

A lighting device for vehicle according to one embodiment is provided with a socket; a light emitting unit which is provided at one end portion of the socket, and includes a light emitting element; an insulating portion which includes a resin, and is provided inside a hole provided in the socket; a power feeding terminal which has conductivity, extends inside the insulating portion, and of which one end protrudes from the insulating portion, and is electrically connected to the light emitting unit; and a melting portion which is connected to an inner wall face of the hole, and at least one end face of the insulating portion.

Hereinafter, the embodiment will be exemplified with reference to drawings. In addition, in each figure, the same reference numerals are attached to the same constituent elements, and detailed descriptions thereof will be appropriately omitted.

Lighting Device for Vehicle

A lighting device for vehicle 1 according to the embodiment can be provided in a vehicle, a railway vehicle, or the like, for example. As the lighting device for vehicle 1 provided in a vehicle, for example, it is possible to exemplify a device which is used in a front combination light (for example, light in which daytime running lamp (DRL), position lamp, turn signal lamp, and the like, are appropriately combined), a rear combination light (for example, stop lamp, tail lamp, turn signal lamp, back lamp, fog lamp, and the like, are appropriately combined), or the like. However, a use of the lighting device for vehicle 1 is not limited to these.

FIG. 1 is a schematic perspective view for exemplifying the lighting device for vehicle 1 according to the embodiment.

Figure 2:
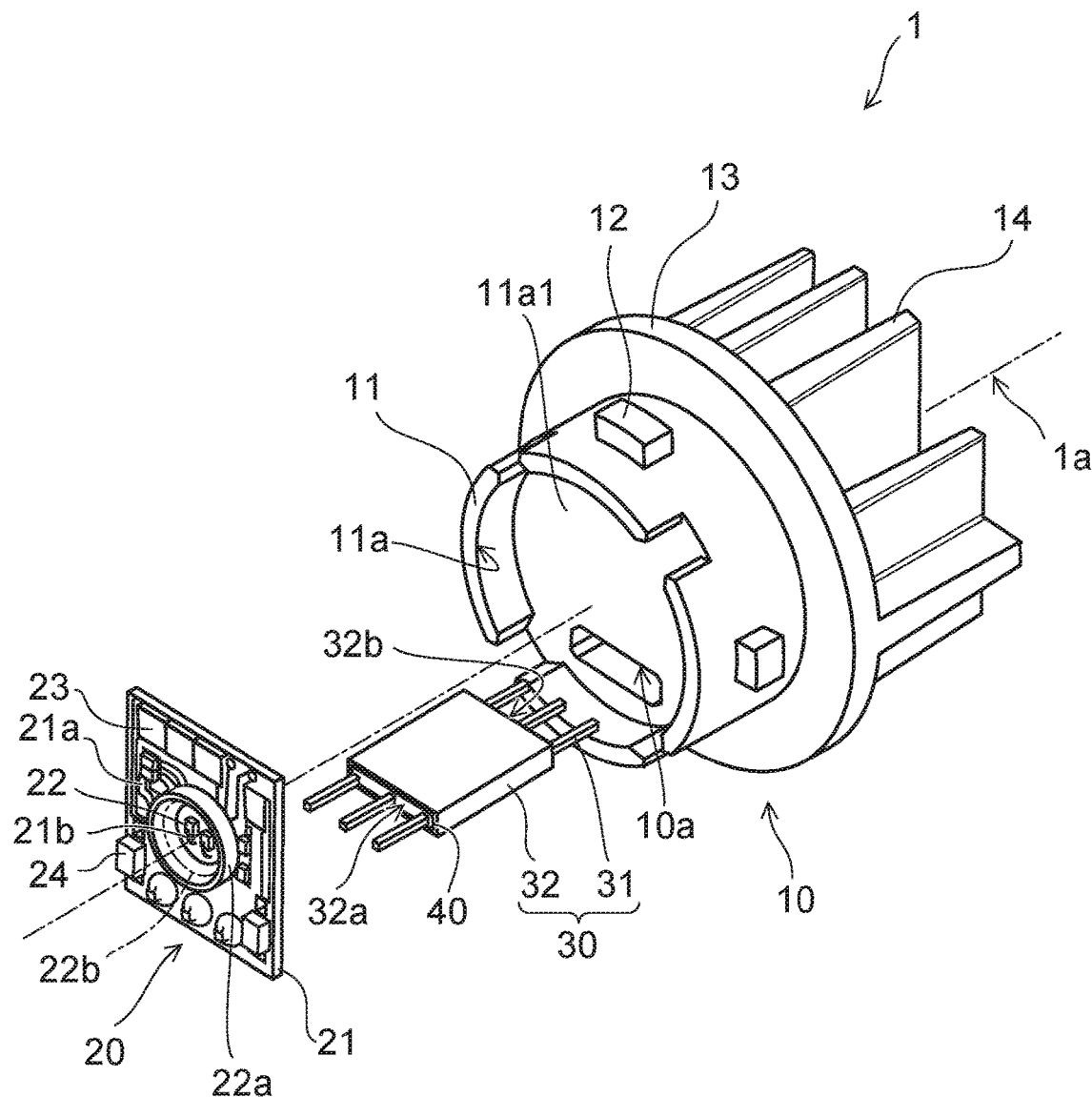
FIG. 2 is a schematic exploded view of the lighting device for vehicle.

FIG. 2 is a schematic exploded view of the lighting device for vehicle 1.

Figure 3A:
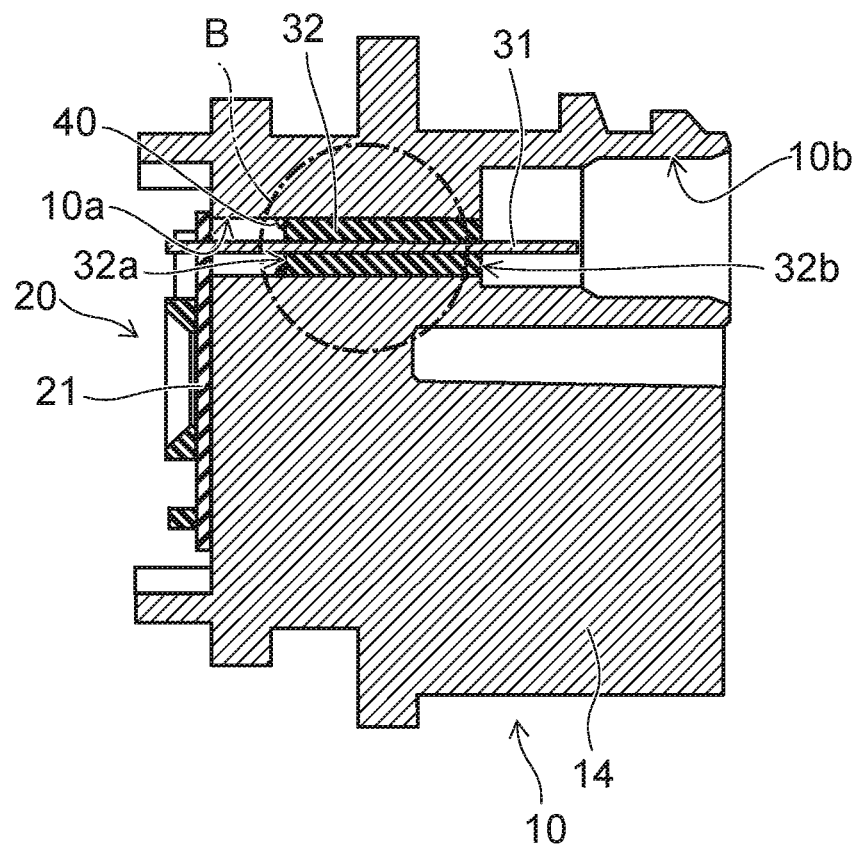
FIG. 3A is a linear sectional view of the lighting device for vehicle taken along line A-A in FIG. 1.
Figure 3B:
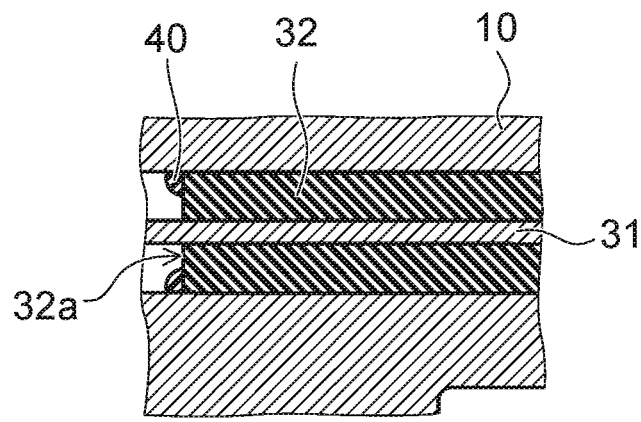
FIG. 3B is a schematic enlarged view of a portion B in FIG. 3A.

FIG. 3A is a linear sectional view of the lighting device for vehicle 1 taken along line A-A in FIG. 1. In addition, in FIG. 3A, a light emitting unit 20 is simplified for the sake of brevity. FIG. 3B is a schematic enlarged view of a portion B in FIG. 3A.

As illustrated in FIGS. 1 to 3B, a socket 10, the light emitting unit 20, a power feeding unit 30, and a melting portion 40 are provided in the lighting device for vehicle 1.

The socket 10 includes a mounting unit 11, a bayonet 12, a flange 13, and a heat radiating fin 14.

The mounting unit 11 is provided on a face of the flange 13 on a side opposite to a side on which the heat radiating fin 14 is provided. An external shape of the mounting unit 11 can be set to a columnar shape. The external shape of the mounting unit 11 is, for example, a cylindrical shape. The mounting unit 11 includes a recessed portion 11a which is open to an end face on a side opposite to the flange 13 side. The light emitting unit 20 is provided on a base 11a1 of the recessed portion 11a.

The bayonet 12 is provided on an outer face of the mounting unit 11. The bayonet 12 protrudes toward the outside of the lighting device for vehicle 1. The bayonet 12 faces the flange 13. A plurality of the bayonets 12 are provided. The bayonet 12 is used when attaching the lighting device for vehicle 1 to a housing 101 of a lighting tool for vehicle 100. The bayonet 12 is used for twist-lock.

The flange 13 is formed in a plate shape. The flange 13 can be formed in disk shape, for example. An outer face of the flange 13 is located in the outside of the lighting device for vehicle 1 compared to an outer face of the bayonet 12.

The heat radiating fin 14 is provided on a face of the flange 13 on a side opposite to the side on which the mounting unit 11 is provided. A plurality of the heat radiating fins 14 can be provided. The plurality of heat radiating fins 14 can be provided so as to be parallel to each other. The heat radiating fins 14 can be set to a flat plate shape.

A hole 10a, and a hole 10b connected to the hole 10a are provided in the socket 10. An insulating portion 32 is provided inside the hole 10a. A connector 105 including a sealing member 105a is inserted into the hole 10b. For this reason, a sectional shape of the hole 10b is set to a shape which is appropriate for a sectional shape of the connector 105 including the sealing member 105a.

Heat generated in the light emitting unit 20 is mainly transmitted to the heat radiating fin 14 through the mounting unit 11 and the flange 13. The heat transmitted to the heat radiating fin 14 is mainly radiated to the outside from the heat radiating fin 14.

For this reason, it is preferable to form the socket 10 using a material with high heat conductivity by taking transmitting of heat generated in the light emitting unit 20 to the outside into consideration. A material with high heat conductivity can be set, for example, to metal such as aluminum, or a high heat conductive resin. In this case, the socket 10 can be set to a material including at least any one of the metal and the high heat conductive resin.

The high heat conductive resin is a resin obtained by mixing filler formed of aluminum oxide with high heat conductivity, or carbon into a resin of polyethylene terephthalate (PET), nylon, or the like, for example. In addition, when forming the socket 10 using the high heat conductive resin, it is possible to efficiently radiate heat generated in the light emitting unit 20, and to make the socket light weight.

The light emitting unit 20 includes a substrate 21, a light emitting element 22, a resistor 23, and a control element 24.

The substrate 21 is provided on the base 11a1 of the recessed portion 11a. The substrate 21 is formed in a flat plate shape. A planar shape of the substrate 21 can be set to a quadrangle, for example.

A material or a structure of the substrate 21 is not particularly limited. For example, the substrate 21 can be formed of an inorganic material such as ceramic (for example, aluminum oxide, aluminum nitride, or the like), an organic material such as paper phenol, glass epoxy, or the like. In addition, the substrate 21 may be a substrate obtained by covering the surface of a metal plate with an insulating material. When covering the surface of a metal plate with the insulating material, the insulating material may be formed of an organic material or an inorganic material.

When heat quantity of the light emitting element 22 is large, it is preferable to form the substrate 21 using a material with high heat conductivity by taking a heat radiation into consideration. As a material with high heat conductivity, for example, it is possible to exemplify ceramic such as aluminum oxide or aluminum nitride, a high heat conductive resin, a material obtained by covering the surface of a metal plate with an insulating material, or the like.

In addition, the substrate 21 may be formed in a single layer, or a multiple layer.

A wiring pattern 21a is provided on the surface of the substrate 21. The wiring pattern 21a can be formed of a material of which a main component is silver. The wiring pattern 21a can be formed of silver, or a silver alloy, for example. However, a material of the wiring pattern 21a is not limited to the material of which the main component is silver. It is also possible to form the wiring pattern 21a using a material of which a main component is copper, for example.

The light emitting element 22 is provided on a side opposite to the base 11a1 side (socket 10 side) of the recessed portion 11a of the substrate 21. The light emitting element 22 is provided on the substrate 21. The light emitting element 22 is electrically connected to the wiring pattern 21a provided on the surface of the substrate 21. The light emitting element 22 can be set to a light emitting diode, an organic light emitting diode, a laser diode, or the like. A plurality of the light emitting element 22 can be provided. The plurality of light emitting elements 22 can be connected to each other in series. In addition, the light emitting element 22 is connected to the resistor 23 in series.

A type of the light emitting element 22 is not particularly limited. The light emitting element 22 can be set to a surface mounting-type light emitting element such as a plastic leaded chip carrier (PLCC) type. The light emitting element 22 can be also set to a light emitting element including a lead wire of a cannonball type, or the like.

In this case, when it is set to a light emitting element 22 which is mounted, using a chip on board (COB), it is possible to increase mounting density, and miniaturize the lighting device for vehicle 1.

When it is set to the light emitting element 22 which is mounted, using the chip on board (COB), as illustrated in FIGS. 1 and 2, the chip-shaped light emitting element 22, a wiring 21b which electrically connects the light emitting element 22 and the wiring pattern 21a, a frame-shaped member 22a which surrounds the light emitting element 22 and the wiring 21b, a sealing portion 22b which is provided inside the frame-shaped member 22a, and the like, can be provided on the substrate 21.

In this case, a phosphor can be contained in the sealing portion 22b. The phosphor can be set to a yttrium-aluminum-garnet-based phosphor (YAG), for example. However, a type of the phosphor can be appropriately changed so as to obtain a desired luminescent color according to a use of the lighting device for vehicle 1, or the like.

A top face of the light emitting element 22 as a light emitting face faces the front face side of the lighting device for vehicle 1, and the light emitting element 22 mainly outputs light toward the front face side of the lighting device for vehicle 1. The number of light emitting elements 22, and a size, an arrangement, and the like, thereof are not limited to examples, and can be appropriately changed according to a size, a use, or the like, of the lighting device for vehicle 1.

The resistor 23 is provided on a side opposite to the base 11a1 side of the recessed portion 11a of the substrate 21. The resistor 23 is provided on the substrate 21. The resistor 23 is electrically connected to the wiring pattern 21a provided on the surface of the substrate 21.

The resistor 23 can be set to a surface mounting-type resistor, a resistor with a lead wire (metal oxide film resistor), a film-shaped resistor which is formed, using a screen printing method, or the like.

The resistor 23 exemplified in FIGS. 1 and 2 is a film-shaped resistor.

A material of the film-shape resistor can be set to ruthenium oxide ($RuO_2$), for example. It is possible to form the film-shaped resistor using a screen printing method and a baking method, for example. When the resistor 23 is set to the film-shaped resistor, a heat radiating property can be improved, since it is possible to make a contact area between the resistor 23 and the substrate 21 large. In addition, it is possible to form a plurality of resistors 23 at one time. For this reason, it is possible to improve productivity, and suppress unevenness in resistance value in the plurality of resistors 23.

Here, since there is unevenness in forward voltage characteristics of the light emitting element 22, when setting an application voltage between an anode terminal and a ground terminal to be constant, there is unevenness in brightness of light (light flux, luminance, intensity of light, and illuminance) which is radiated from the light emitting element 22. For this reason, it is set so that a value of current which flows in the light emitting element 22 falls in a predetermined range using the resistor 23, so that a brightness of light radiated from the light emitting element 22 falls in a predetermined range. In this case, it is set so that a value of current which flows in the light emitting element 22 falls in a predetermined range, by changing a resistance value of the resistor 23.

When the resistor 23 is the surface mounting-type resistor or the resistor with a lead wire, a resistor 23 with an appropriate resistance value is selected according to the forward voltage characteristics of the light emitting element 22.

When the resistor 23 is the film-shaped resistor, it is possible to increase a resistance value by removing a part of the resistor 23. For example, it is possible to easily remove a part of the resistor 23 by radiating laser light to the resistor 23. The number, a size, an arrangement, and the like, of the resistor 23 are not limited to examples, and can be appropriately changed according to the number, a specification, or the like, of light emitting elements 22.

The control element 24 is provided on a side opposite to the base 11a1 side of the recessed portion 11a of the substrate 21. The control element 24 is provided on the substrate 21. The control element 24 is electrically connected to the wiring pattern 21a provided on the surface of the substrate 21. The control element 24 is provided so as to cause a backward voltage not to be applied to the light emitting element 22, and cause a pulse noise from a reverse direction not to be applied to the light emitting element 22.

The control element 24 can be set to a diode, for example. The control element 24 can be set to a surface mounting-type diode, a diode with a lead wire, or the like, for example. The control element 24 exemplified in FIGS. 1 and 2 is the surface mounting-type diode.

In addition, it is also possible to provide a pull-down resistor in order to detect disconnection of the light emitting element 22, or prevent erroneous lighting. In addition, it is also possible to provide a covering portion (not illustrated) which covers the wiring pattern 21a, the film-shaped resistor, or the like. The covering portion can be set to a portion which includes a glass material, for example.

It is also possible to provide a heat radiating plate, or a layer formed of heat conductive grease between the substrate 21 and the base 11a1 of the recessed portion 11a. The heat radiating plate is formed in a plate shape, and can be formed of a material with high heat conductivity. The heat radiating plate can be formed of metal such as aluminum, an alloy of aluminum, or the like, for example. When providing the heat radiating plate, or the layer formed of heat conductive grease, heat generated in the light emitting unit 20 is easily transmitted to the socket 10.

The power feeding unit 30 includes a power feeding terminal 31 and the insulating portion 32.

The power feeding terminal 31 can be set to a rod-like body. A plurality of the power feeding terminals 31 are provided. The plurality of power feeding terminals 31 can be provided in a line in a predetermined direction. The plurality of power feeding terminals 31 are provided inside the insulating portion 32. The plurality of power feeding terminals 31 extend inside the insulating portion 32, and protrude from an end face 32a of the insulating portion 32 on the light emitting unit 20 side, and an end face 32b of the insulating portion 32 on the heat radiating fin 14 side.

As illustrated in FIG. 3A, end portions of the plurality of power feeding terminals 31 on the light emitting unit 20 side are electrically or mechanically connected to the wiring pattern 21a provided on the substrate 21. That is, one end portion of the power feeding terminal 31 is soldered with the wiring pattern 21a. End portions of the plurality of power feeding terminals 31 on the heat radiating fin 14 side are exposed into the hole 10b. The connector 105 is fitted to the plurality of power feeding terminals 31 which are exposed into the hole 10b.

The power feeding terminal 31 has conductivity. The power feeding terminal 31 can be formed of metal such as a copper alloy, or the like, for example. In addition, the number, a shape, a material, and the like, of the power feeding terminal 31 are not limited to the examples, and can be appropriately changed.

As described above, the socket 10 is formed of a material with high heat conductivity; however, there is a case in which the material with high heat conductivity has conductivity. For example, metal, a high heat conductive resin including a filler containing carbon, or the like, has conductivity. For this reason, the insulating portion 32 is provided so as to insulate between the power feeding terminal 31 and the socket 10 with conductivity. The insulating portion 32 also has a function of holding the plurality of power feeding terminals 31.

The insulating portion 32 includes an insulating property. The insulating portion 32 can be formed of an insulting resin. The insulating portion 32 can be formed of PET, nylon, or the like, for example. The insulating portion 32 can be press-fitted into the hole 10a which is provided in the socket 10, for example.

Here, a linear expansion coefficient of a resin as a material of the insulating portion 32 is approximately 100° C. to $140 \times 10^{-6}$° C. A linear expansion coefficient of metal, the high heat conductive resin, or the like, as the material of the socket 10 is approximately 10° C. to $20 \times 10^{-6}$° C. That is, the linear expansion coefficient of the insulating portion 32 is higher than that of the socket 10 approximately by 5 times to 10 times. For this reason, a thermal expansion amount (or, thermal contraction amount) of the insulating portion 32 and a thermal expansion amount (or, thermal contraction amount) of the socket 10 is remarkably different.

In a case of the lighting device for vehicle 1 provided in a vehicle, a temperature of use environment is changed in a range of −40° C. to 85° C. For this reason, thermal expansion and thermal contraction of a different amount repeatedly occur in the insulating portion 32 and the socket 10 due to a change in temperature of use environment. When thermal expansion and thermal contraction of a different amount repeatedly occur, a sectional dimension of the hole 10a becomes large, or a sectional dimension of the insulating portion 32 becomes small with the lapse of time, and there is a concern that a slight gap may be formed between the inner wall face of the hole 10a of the socket 10 and the insulating portion 32. When a gap is formed between the inner wall face of the hole 10a of the socket 10 and the insulating portion 32, there is a concern that bonding intensity between the socket 10 and the insulating portion 32 may decrease.

Therefore, the melting portion 40 is provided in the lighting device for vehicle 1 according to the embodiment.

As illustrated in FIGS. 3A and 3B, the melting portion 40 is provided in the vicinity of a peripheral edge of the end face 32a of the insulating portion 32. The melting portion 40 can be provided along the peripheral edge of the end face 32a of the insulating portion 32. In this case, the melting portion 40 may be continuously provided, or may be intermittently provided along the peripheral edge of the end face 32a of the insulating portion 32. That is, a planar shape of the melting portion 40 may be an annular shape, or may be an island shape, or a point shape.

The melting portion 40 is connected to the inner wall face of the hole 10a, and the end face 32a of the insulating portion 32.

An end portion of the melting portion 40 on the insulating portion 32 side can be formed integrally with the insulating portion 32. In addition, the end portion of the melting portion 40 on the insulating portion 32 side also can melt on the end face 32a of the insulating portion 32.

When the inner wall face of the hole 10a is formed of metal, an end portion of the melting portion 40 on the inner wall face side of the hole 10a can be mechanically bonded to the socket 10 by entering inside a fine irregular portion which is formed on the inner wall face of the hole 10a. In addition, the end portion of the melting portion 40 on the inner wall face side of the hole 10a also can be directly bonded (chemical bond) to the inner wall face of the hole 10a without an adhesive, or the like.

When the inner wall face of the hole 10a is formed of the high heat conductive resin, and the end portion of the melting portion 40 on the insulating portion 32 side is formed integrally with the insulating portion 32, the end portion of the melting portion 40 on the inner wall face side of the hole 10a can melt on the inner wall face of the hole 10a.

When the inner wall face of the hole 10a is formed of the high heat conductive resin, and the end portion of the melting portion 40 on the insulating portion 32 side is melt on the end face 32a of the insulating portion 32, the end portion of the melting portion 40 on the inner wall face side of the hole 10a also can be formed integrally with the socket 10, and also can melt on the inner wall face of the hole 10a.

That is, the end portion of the melting portion 40 melts on at least one of the inner wall face of the hole 10a and the end face 32a of the insulating portion 32.

In addition, the insulating portion 32 can be press-fitted into the hole 10a; however, there is a case in which a partial gap is formed between the insulating portion 32 and the inner wall face of the hole 10a depending on a form accuracy of the insulating portion 32 and a form accuracy of the hole 10a. When such a gap is formed on the end face 32a side of the insulating portion 32, it is possible to set so that the melting portion 40 enters the gap.

The melting portion 40 includes a resin. It is possible to set the melting portion 40 to a portion including a thermoplastic resin. The thermoplastic resin can be set to, for example, PET, nylon, polypropylene, polyethylene, polystyrene, or the like, for example.

As will be described later, the melting portion 40 is formed by heating and melting a protrusion portion 41, or an annular member 41a. In this case, when heating the protrusion portion 41 or the annular member 41a, vicinity of the peripheral edge of the end face 32a, and the inner wall face of the hole 10a are also heated. For this reason, there is a case in which a material (resin) of the insulating portion 32 is mixed into the melting portion 40. In addition, when the socket 10 is formed of a high heat conductive resin, there is a case in which the high heat conductive resin is mixed into the melting portion 40.

In addition, in FIGS. 3A and 3B, the melting portion 40 connected to the end face 32a of the insulating portion 32 on the light emitting unit 20 side is exemplified; however, it may be set to a melting portion 40 connected to an end face 32b of the height insulating portion 32 on the heat radiating fin 14 side. The melting portion 40 connected to the end face 32a of the insulating portion 32, and the melting portion 40 connected to the end face 32b of the insulating portion 32 may be provided. That is, at least any one of the melting portion 40 connected to the end face 32a of the insulating portion 32, and the melting portion 40 connected to the end face 32b of the insulating portion 32 may be provided. That is, the melting portion 40 may be connected to the inner wall face of the hole 10a, and at least one end face of the insulating portion 32.

Since the melting portion 40 is provided in the lighting device for vehicle 1 according to the embodiment, a reliability in fixing of the insulating portion 32 is not damaged even when a gap is formed between the inner wall face of the hole 10a and the insulating portion 32 due to a change in temperature of use environment.

In addition, since the melting portion 40 includes a resin, and is provided on the end faces 32a and 32b of the insulating portion 32, it is easily deformed due to an external force. For this reason, it is possible to suppress exfoliation or a damage of the melting portion 40 even when there is a change in temperature of use environment.

As described above, when the melting portion 40 is provided, it is possible to improve reliability in fixing of the insulating portion 32.

Manufacturing Method of Lighting Device for Vehicle

Hereinafter, as an example, a case in which the melting portion 40 is connected to the inner wall face of the hole 10a, and the end face 32a of the insulating portion 32 on the light emitting unit 20 side will be exemplified.

Figure 4A:
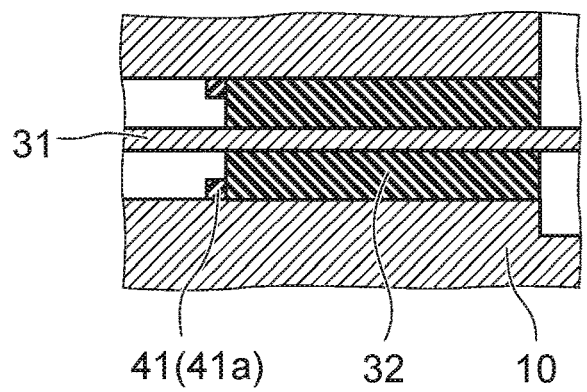
FIGS. 4A and 4B are schematic sectional views for exemplifying a formation of a melting portion.
Figure 4B:
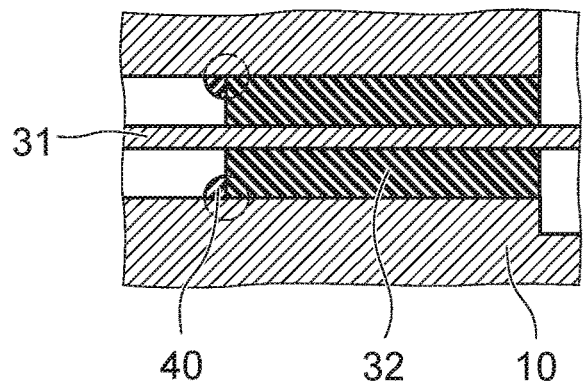

FIGS. 4A and 4B are schematic sectional views for exemplifying a formation of the melting portion 40.

First, the insulating portion 32 including the protrusion portion 41 in the vicinity of the peripheral edge of the end face 32a is formed. The protrusion portion 41 can be formed integrally with the insulating portion 32. The protrusion portion 41 can be formed along the peripheral edge of the end face 32a. In this case, the protrusion portion 41 may be continuously formed, or may be intermittently formed along the peripheral edge of the end face 32a.

Subsequently, the plurality of power feeding terminals 31 are provided inside the insulating portion 32. The end portions of the plurality of power feeding terminals 31 are set to protrude from the end faces 32a and 32b by a predetermined distance. In this case, it is also possible to press-fit the plurality of power feeding terminals 31 into the hole provided in the insulating portion 32, and to integrally mold (insert molding) the plurality of power feeding terminals 31 and the insulating portion 32.

Subsequently, as illustrated in FIG. 4A, the insulating portion 32 holding the power feeding terminal 31 is inserted into the hole 10a which is provided in the socket 10. For example, it is possible to press-fit the insulating portion 32 into the hole 10a.

Subsequently, as illustrated in FIG. 4B, the melting portion 40 is formed by heating the protrusion portion 41. At this time, the vicinity of the peripheral edge of the end face 32a, and the inner wall face of the hole 10a may be partially heated, as well, along with the protrusion portion 41. In this manner, it is possible to mix a material (resin) of the melted protrusion portion 41 and a material (resin) of the melted insulating portion 32. In addition, it is possible to mix a material (resin) of the melted protrusion portion 41 and a material (resin) of the melted socket 10 (high heat conductive resin) when the material of the socket 10 is a high heat conductive resin. For this reason, it is possible to increase bonding intensity between the socket 10 and the melting portion 40, bonding intensity between the insulating portion 32 and the melting portion 40, and bonding intensity between the socket 10 and the insulating portion 32.

When a material of the socket 10 is metal, it is possible to make a material (resin) of the melted protrusion portion 41 enter the inside of the fine irregular portion which is formed on the inner wall face of the hole 10a. In this manner, due to an anchor effect, it is possible to increase bonding intensity between the socket 10 and the melting portion 40, and bonding intensity between the socket 10 and the insulating portion 32. The fine irregular portion can be formed by performing an acid etching treatment, or anodic oxidation on the inner wall face of the hole 10a.

The case in which the protrusion portion 41 is provided in the vicinity of the peripheral edge of the end face 32a was exemplified; however, it is also possible to provide the protrusion portion 41 in the vicinity of the peripheral edge of the end face 32b, or provide the protrusion portion 41 in the vicinity of the peripheral edge of the end faces 32a and 32b.

In the above descriptions, the case in which the protrusion portion 41 is provided on the end faces 32a and 32b of the insulating portion 32 was exemplified; however, the protrusion portion 41 may be provided on the inner wall face of the hole 10a. When the protrusion portion 41 is provided on the inner wall face of the hole 10a, for example, the protrusion portion 41 may be integrally molded on the inner wall face of the hole 10a, when forming the socket 10 formed of a high heat conductive resin.

That is, the melting portion 40 which is connected to the inner wall face of the hole 10a, and at least one end face of the insulating portion 32 may be formed.

In this case, in a process of forming the melting portion 40, at least one end face of the insulating portion 32, or the protrusion portion 41 which is formed integrally with the inner wall face of the hole 10a may be heated.

In addition, it is also possible to cause the annular member 41a to come into contact with any one of the end faces 32a and 32b of the insulating portion 32, and the inner wall face of the hole 10a, instead of the protrusion portion 41 which is formed integrally with the insulating portion 32 or the socket 10.

In this case, in the process of forming the melting portion 40, the annular member 41a may be heated, by providing the annular member 41a which comes into contact with at least one end face of the insulating portion 32, and at least any portion of the inner wall face of the hole 10a.

However, when the protrusion portion 41 which is formed integrally with the insulating portion 32 or the socket 10 is provided, it is possible to increase positional accuracy in bonding, since it becomes easy when performing positioning in the bonding. In addition, when the protrusion portion 41 formed integrally with the insulating portion 32 is provided, it is possible to reduce a manufacturing cost, since manufacturing becomes easy.

Heating can be performed by radiating laser light to the protrusion portion 41 or the annular member 41a, for example. In addition, a heated tool may be pushed against the protrusion portion 41 or the annular member 41a. In addition, the protrusion portion 41 or the annular member 41a may be melted using friction heat such as ultrasonic welding, or the like, for example.

When performing heating, using laser light, it is possible to reduce a manufacturing cost, since manufacturing becomes easy.

When the inner wall face of the hole 10a is formed of metal (for example, when socket 10 is formed of metal), it is also possible to directly bond (chemical bonding) the melting portion 40 onto the inner wall face of the hole 10a without an adhesive, or the like. For example, a reactive functional group which is bonded on to the inner wall face of the hole 10a, chemically and molecularly, may be formed, by performing a chemical bonding (CB) treatment on the inner wall face of the hole 10a. In this case, a chemical reaction on an interface between the inner wall face of the hole 10a and the melting portion 40 is promoted by heat, when the melting portion 40 is formed, using heating.

It is also possible to use the anchor effect using the above described fine irregular portion and the chemical bonding using the reactive functional group together.

Subsequently, the light emitting unit 20 is mounted on the base 11a1 of the recessed portion 11a. At this time, the power feeding terminal 31 is inserted into the hole provided in the substrate 21. It is also possible to provide a heat radiating plate, or a layer formed of heat conductive grease between the substrate 21 and the base 11a1 of the recessed portion 11a, as necessary.

Since it is possible to apply a well-known technology in manufacturing of the light emitting unit 20, detailed descriptions thereof will be omitted.

Subsequently, the power feeding terminal 31 and the wiring pattern 21a are soldered.

As described above, it is possible to manufacture the lighting device for vehicle 1.

Lighting Tool for Vehicle

Subsequently, the lighting tool for vehicle 100 will be exemplified.

Hereinafter, a case in which the lighting tool for vehicle 100 is a front combination light provided in a vehicle will be described, as an example. However, the lighting tool for vehicle 100 is not limited to the front combination light provided in a vehicle. The lighting tool for vehicle 100 may be a lighting tool for vehicle which is provided in a vehicle, a railway vehicle, or the like.

Figure 5:
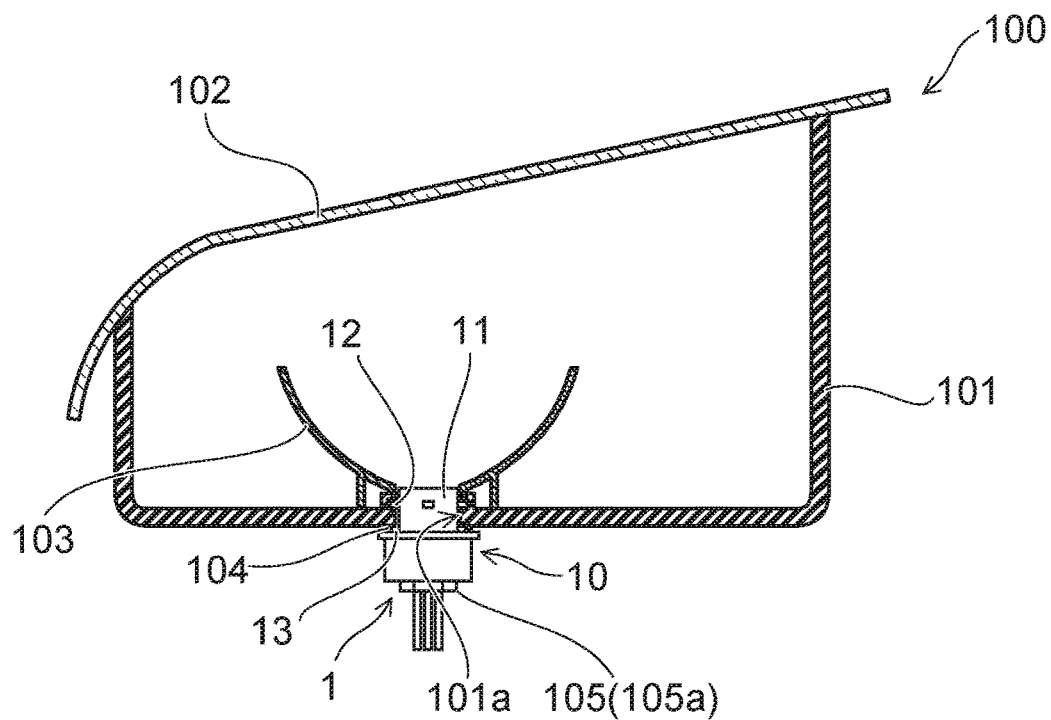
FIG. 5 is a schematic and partial sectional view for exemplifying a lighting tool for vehicle.

FIG. 5 is a schematic and partial sectional view for exemplifying the lighting tool for vehicle 100.

As illustrated in FIG. 5, the lighting device for vehicle 1, a housing 101, a cover 102, an optical element portion 103, a sealing member 104, and the connector 105 are provided in the lighting tool for vehicle 100.

The housing 101 holds the mounting unit 11. The housing 101 is formed in a box shape of which one end portion side is open. The housing 101 can be formed of a resin through which light is not transmitted, or the like, for example. An attaching hole 101a into which a portion in which the bayonet 12 of the mounting unit 11 is provided is inserted is provided on a base of the housing 101. A recessed portion into which the bayonet 12 provided in the mounting unit 11 is provided at the peripheral edge of the attaching hole 101a.

A case in which the attaching hole 101a is directly provided in the housing 101 was exemplified; however, an attaching member including the attaching hole 101a may be provided in the housing 101.

When attaching the lighting device for vehicle 1 to the lighting tool for vehicle 100, the portion in which the bayonet 12 of the mounting unit 11 is provided is inserted into the attaching hole 101a, and the lighting device for vehicle 1 is rotated. Then, the bayonet 12 is held in a joint portion provided at the peripheral edge of the attaching hole 101a. Such an attaching method is referred to as twist-lock.

The cover 102 is provided so as to block the opening of the housing 101. The cover 102 can be formed of a light-transmitting resin, or the like. It is also possible to set the cover 102 to a cover with a function of lens, or the like.

Light output from the lighting device for vehicle 1 is input to the optical element portion 103. The optical element portion 103 performs reflection, diffusion, light guiding, condensing, a formation of a predetermined light distributing pattern, or the like, of light output from the lighting device for vehicle 1. For example, the optical element portion 103 exemplified in FIG. 5 is a reflector. In this case, the optical element portion 103 reflects light output from the lighting device for vehicle 1, and forms a predetermined light distributing pattern.

The sealing member 104 is provided between the flange 13 and the housing 101. The sealing member 104 can be set to a member formed in an annular shape. The sealing member 104 can be formed of a material with elasticity such as rubber, a silicone resin, or the like.

When attaching the lighting device for vehicle 1 to the lighting tool for vehicle 100, the sealing member 104 is interposed between the flange 13 and the housing 101. For this reason, an inner space of the housing 101 is enclosed by the sealing member 104. In addition, the bayonet 12 is pushed to the housing 101 due to an elastic force of the sealing member 104. For this reason, it is possible to prevent the lighting device for vehicle 1 from escaping from the housing 101.

The connector 105 is fitted to end portions of the plurality of power feeding terminals 31 which are exposed to the inside of the hole 10b. A power supply (not illustrated), or the like, is electrically connected to the connector 105. For this reason, the power supply (not illustrated), or the like, and the light emitting element 22 are electrically connected when the connector 105 is fitted to the end portion of the power feeding terminal 31. In addition, the connector 105 has a stepped portion. In addition, a sealing member 105a is attached to the stepped portion. The sealing member 105a is provided in order to prevent water from entering the inside of the hole 10b. When the connector 105 including the sealing member 105a is inserted into the hole 10b, the hole 10b is enclosed so as to be watertight. The sealing member 105a can be formed in an annular shape. The sealing member 105a can be formed of a material with elasticity such as rubber, a silicone resin, or the like. It is also possible to bond the connector 105 to an element on the socket 10 side using an adhesive, or the like, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, above-mentioned embodiments can be combined mutually and can be carried out.

What is claimed is:

1. A lighting device for vehicle comprising:
a socket having a heat radiating fin;
a light emitting unit which is provided at one end portion of the socket, and includes a light emitting element;
an insulating portion which includes a resin, and is provided inside a hole provided in the socket, the hole being a through hole;
a power feeding terminal which has conductivity, extends inside the insulating portion, and of which one end portion protrudes from the insulating portion, and is electrically connected to the light emitting unit; and
a melting portion which is connected to an inner wall face of the hole, the melting portion being further connected to at least one of an end face on the light emitting unit side, and an end face on the heat radiating fin side of the insulating portion.

2. The device according to claim 1,
wherein an end portion of the melting portion on an insulating portion side is fused on an end face of the insulating portion.

3. The device according to claim 1,
wherein an end portion of the melting portion on an insulating portion side is formed integrally with the insulating portion.

4. The device according to claim 1,
wherein the inner wall face of the hole is formed of a resin, and
an end portion of the melting portion on an inner wall face side of the hole is fused on the inner wall face of the hole.

5. The device according to claim 1,
wherein the inner wall face of the hole is formed of metal, and
an end portion of the melting portion on an inner wall face side of the hole enters the inside of an irregular portion formed on the inner wall face of the hole.

6. The device according to claim 1,
wherein the inner wall face of the hole is formed of metal, and
an end portion of the melting portion on an inner wall face side of the hole is chemically bonded to the inner wall face of the hole.

7. The device according to claim 1,
wherein the melting portion is provided in vicinity of a peripheral edge of the end face of the insulating portion.

8. The device according to claim 1,
wherein the melting portion is provided along a peripheral edge on the end face of the insulating portion.

9. The device according to claim 1,
wherein the melting portion is continuously formed along a peripheral edge of the end face of the insulating portion.

10. The device according to claim 1,
wherein the melting portion is intermittently formed along a peripheral edge of the end face of the insulating portion.

11. The device according to claim 1,
wherein a planar shape of the melting portion is an annular shape.

12. The device according to claim 1,
wherein a planar shape of the melting portion is an island shape or a point shape.

13. The device according to claim 1,
wherein an end portion of the melting portion is fused on at least any one of the inner wall face of the hole and the end face of the insulating portion.

14. The device according to claim 1,
wherein the melting portion includes a thermal plastic resin.

15. The device according to claim 1,
wherein the socket includes at least any one of metal and a high heat conductive resin.

16. The device according to claim 1,
wherein the socket has conductivity.

17. The device according to claim 1,
wherein the insulating portion includes the resin with an insulating property.

18. A manufacturing method of a lighting device for vehicle comprising:
inserting an insulating portion which holds a power feeding terminal into a hole provided in a socket having a heat radiating fin, the hole provided in the socket being a through hole; and
forming a melting portion which is connected to an inner wall face of the hole, and at least one end face of the insulating portion,
at least one of an end face on the light emitting unit side, and an end face on the heat radiating fin side of the insulating portion, or a protrusion portion which is integrally formed with the inner wall face of the hole being heated, in the forming of the melting portion.

19. A manufacturing method of a lighting device for vehicle comprising:
inserting an insulating portion which holds a power feeding terminal into a hole provided in a socket having a heat radiating fin, the hole provided in the socket being a through hole; and
forming a melting portion which is connected to an inner wall face of the hole, and at least one of an end face on the light emitting unit side, and an end face on the heat radiating fin side of the insulating portion,
an annular member which comes into contact with at least one end face of the insulating portion, and at least any portion of the inner wall face of the hole being provided, and the annular member being heated, in the forming of the melting portion.

20. A lighting tool for vehicle comprising:
the lighting device for vehicle according to claim 1; and
a housing to which the lighting device for vehicle is attached.

* * * * *